United States Patent
Gardner

(10) Patent No.: US 9,545,859 B2
(45) Date of Patent: Jan. 17, 2017

(54) SEAT

(71) Applicant: Guy M. Gardner, Reno, NV (US)

(72) Inventor: Guy M. Gardner, Reno, NV (US)

(73) Assignee: Prisoner Transport Systems LLC, Sparks, NV (US)

(*) Notice: Subject to any disclaimer, the term of this patent is extended or adjusted under 35 U.S.C. 154(b) by 148 days.

(21) Appl. No.: 13/962,127

(22) Filed: Aug. 8, 2013

(65) Prior Publication Data
US 2014/0042791 A1 Feb. 13, 2014

Related U.S. Application Data

(60) Provisional application No. 61/681,522, filed on Aug. 9, 2012.

(51) Int. Cl.
| | | |
|---|---|---|
| *B60N 2/44* | (2006.01) | |
| *B62D 65/14* | (2006.01) | |
| *B60N 2/68* | (2006.01) | |
| *B60R 22/00* | (2006.01) | |
| *B60R 21/02* | (2006.01) | |
| *B60R 22/02* | (2006.01) | |

(Continued)

(52) U.S. Cl.
CPC .............. *B60N 2/44* (2013.01); *B60N 2/015* (2013.01); *B60N 2/24* (2013.01); *B60N 2/643* (2013.01); *B60N 2/646* (2013.01); *B60N 2/68* (2013.01); *B60N 2/686* (2013.01); *B60R 21/026* (2013.01); *B60R 22/00* (2013.01); *B60R 22/023* (2013.01); *B60R 22/22* (2013.01); *B62D 65/14* (2013.01); *B60N 2/26* (2013.01); *B60N 3/06* (2013.01); *B60R 22/30* (2013.01); *B60R 2022/003* (2013.01); *Y10T 29/49826* (2015.01)

(58) Field of Classification Search
USPC .................... 297/452.14, 452.21; 296/24.42
See application file for complete search history.

(56) References Cited

U.S. PATENT DOCUMENTS 4,568,106 A * 2/1986 Yokoyama .................. 280/807
4,717,202 A * 1/1988 Batchelder et al. ..... 297/188.04
(Continued)

FOREIGN PATENT DOCUMENTS

| CA | 2300724 A1 * | 4/1990 |
|---|---|---|
| EP | 0364303 * | 4/1990 |

(Continued)

OTHER PUBLICATIONS http://risingcar.com/e7-police-car/e7-police-car-prisoner-seat/.
http://www.fleetsafety.com/Caprice-Rear-Prisoner-Transport-Plastic-Seat-from-Laguna-3P-1966.
http://www.fleetsafety.com/Police-Prisoner-Transport-Contour-Rear-Seat-by-ProGard-907.

*Primary Examiner* — David E Allred
(74) *Attorney, Agent, or Firm* — ATIP Law; Ian Burns

(57) ABSTRACT

A seat for use in a passenger vehicle, e.g. for prisoner transport, comprises a molded piece having at least one first contact zone at a periphery of the molded piece and at least second contact zone located inward of the periphery of molded piece. The second contact zone may comprise a multi-surface formation that is configured to engage a multi-surface formation of a vehicle body. The molded piece may comprise one or more recesses designed to accommodate the body of a passenger. The at least one second contact zone may be disposed in an area of the seat that receives the buttocks of a passenger, thereby providing additional support in a load bearing area of the seat.

16 Claims, 11 Drawing Sheets

(51) Int. Cl.
    *B60R 22/22*     (2006.01)
    *B60N 2/64*     (2006.01)
    *B60N 2/015*     (2006.01)
    *B60N 2/24*     (2006.01)
    *B60N 3/06*     (2006.01)
    *B60N 2/26*     (2006.01)
    *B60R 22/30*     (2006.01)

(56) References Cited

U.S. PATENT DOCUMENTS

| | | | |
|---|---|---|---|
| 4,813,745 A | 3/1989 | Woody | |
| 4,925,246 A | 5/1990 | Corcoran | |
| 5,265,909 A * | 11/1993 | Verbeski | B60R 22/22 280/808 |
| 5,511,856 A * | 4/1996 | Merrick et al. | 297/476 |
| 5,522,645 A * | 6/1996 | Dahlbacka | 297/452.55 |
| 5,967,614 A | 10/1999 | Schmidt | |
| 6,550,858 B1 | 4/2003 | Grohs et al. | |
| 6,626,477 B2 | 9/2003 | Maynard et al. | |
| 6,733,710 B2 | 5/2004 | Lewis | |
| 6,796,606 B2 | 9/2004 | Marshall | |
| 7,111,888 B1 * | 9/2006 | Dehart | 296/68.1 |
| 2004/0108707 A1 * | 6/2004 | Eusebi | B60R 22/00 280/807 |
| 2007/0063505 A1 * | 3/2007 | Eusebi | B60R 22/00 280/801.1 |
| 2010/0117413 A1 * | 5/2010 | Squires | 297/217.1 |
| 2010/0219220 A1 * | 9/2010 | Bostrom et al. | 224/547 |
| 2020/1000524 | 9/2010 | Bastus | |
| 2013/0113232 A1 * | 5/2013 | Sage | B60R 21/12 296/24.46 |
| 2015/0151651 A1 * | 6/2015 | Stingle | B60N 2/0732 296/65.11 |

FOREIGN PATENT DOCUMENTS

| | | | |
|---|---|---|---|
| EP | 642947 A1 * | 3/1995 | B60N 2/24 |
| FR | 2820700 | 8/2002 | |
| FR | 2944499 A3 * | 10/2010 | |

\* cited by examiner

SEAT

CROSS REFERENCE TO RELATED APPLICATIONS

This application claims priority to U.S. provisional patent application Ser. No. 61,681,522 filed Aug. 9, 2012 the contents of which is herein incorporated by reference.

FIELD OF THE INVENTION

The present invention relates to seats and in particular to car seats. More particularly, though not exclusively, this invention relates to seats for use in police cars for transporting prisoners.

BACKGROUND

Prisoner transport seats for patrol cars, typically sedans, that are vacuum formed are currently anchored and supported to the vehicle body around the perimeter in a zone that extends from the perimeter inward for approximately 4-8 inches. The center of the seat (under the passenger's buttocks) is not supported and does not come in contact with the vehicle. When a passenger is placed in the seat, the passenger's weight, concentrated directly under the buttocks, tends to cause the seat to flex. This tendency to flex is counteracted by increasing the thickness of the seat material and having geometry upsets in the vehicle which add to the structural stiffness of the seat. These geometry upsets conflict with the shape of the passenger's body, cause discomfort to the passenger, and make it difficult for the passenger to slide into place.

What is required is an improved seat, in particular for prisoner transport. Also required is an improved arrangement for mounting a prisoner transport seat in other types of vehicles, such as Sport Utility Vehicles (SUVs).

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to support a seat in a weight bearing area of the seat;

provide a vacuum formed seat with reduced manufacturing costs;

provide a vacuum formed seat that can use a thinner material;

provide a prisoner transport seat with increased lifetime due to reduced stress and fatigue;

provide a prisoner transport seat with increased comfort;

provide a support arrangement for a vacuum formed seat in an SUV;

the ability to mount a seat belt retractor underneath a seat;

the ability to centrally mount a seat belt retractor; and the ability to mount a security grill.

These and other advantages may be realized by reference to the remaining portions of the specification, claims, and abstract.

BRIEF DESCRIPTION OF ONE EMBODIMENT OF THE PRESENT INVENTION

In one embodiment, there is provided a seat for use in a passenger vehicle that comprises a molded piece comprising at least one first contact zone at a periphery of the molded piece and at least second contact zone located inward of the periphery of molded piece. The at least one second contact zone may comprise a multi-surface formation that is configured to engage a multi-surface formation of a vehicle body. The molded piece may comprise one or more recesses designed to accommodate the body of a passenger. The at least one second contact zone may be disposed in an area of the seat that receives the buttocks of a passenger.

In one embodiment, there is provided a method for installing the rear passenger seat in a rear passenger bay of a vehicle. The method may include securing at least one first contact zone to a first portion of a vehicle body and engaging at least one second contact zone with a second portion of the vehicle body.

In one embodiment, there is provided a vehicle seat support arrangement comprising a cross frame member, at least one vertical support and at least one seat support member extending from the vertical support. The cross member extends between first and second sides of the vehicle. The vertical support extends downward of the cross frame member and is secured to the floor of the vehicle. A seat may be secured to the arrangement with a body recess portion of the seat supported by the seat support member.

In one embodiment, there is provided a method of securing a single piece molded seat within a rear passenger bay of a vehicle using the vehicle seat support arrangement. The method may include locating the seat support framework within the vehicle and securing the cross member at first and second sides of the vehicle, such as at seat belt anchor points of the vehicle. The vertical supports may be secured at the floor and then the seat may be secured to the framework.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
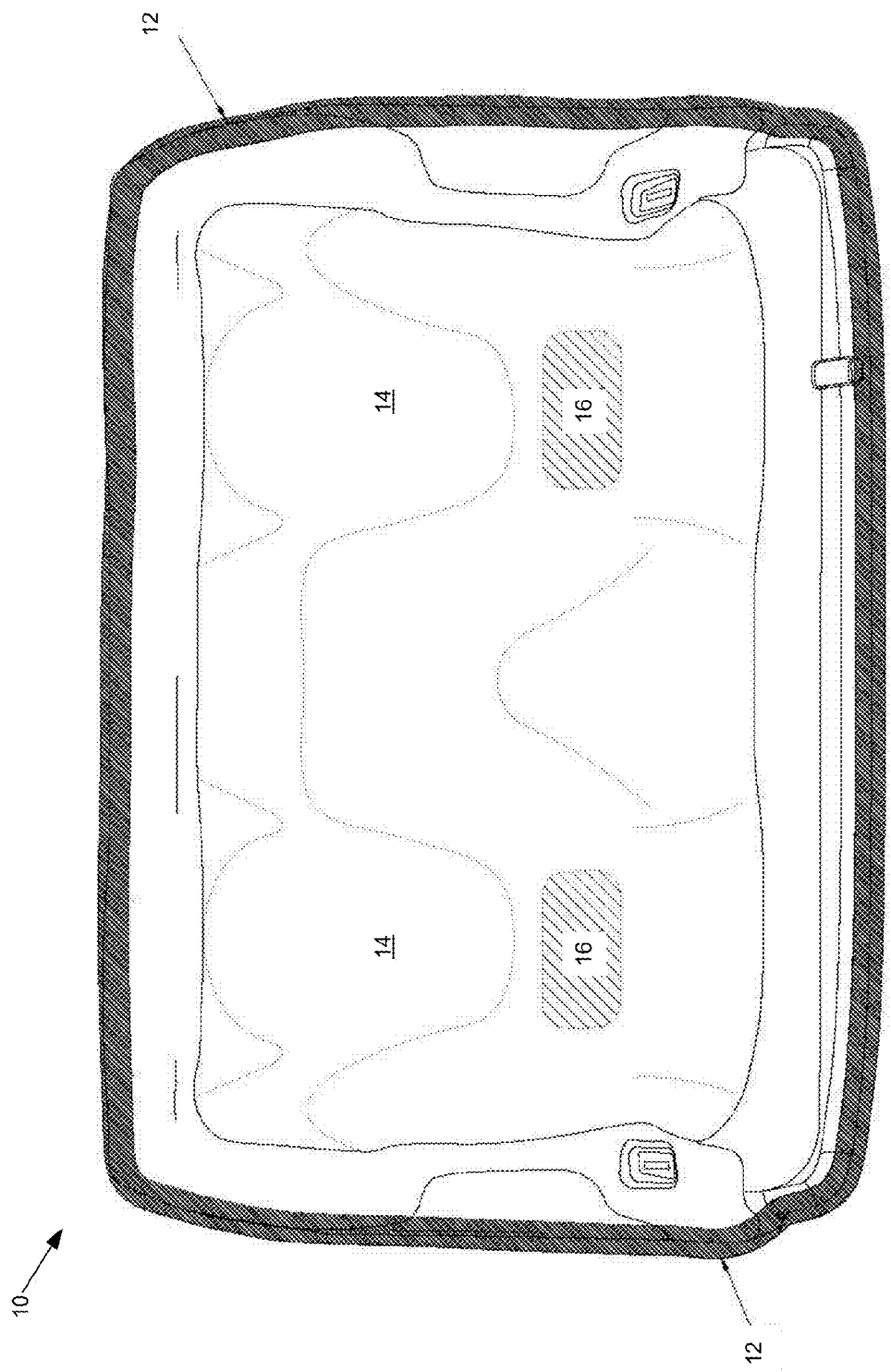
FIG. 1 is substantially a plan view of one embodiment of the seat of the present invention.
Figure 2:
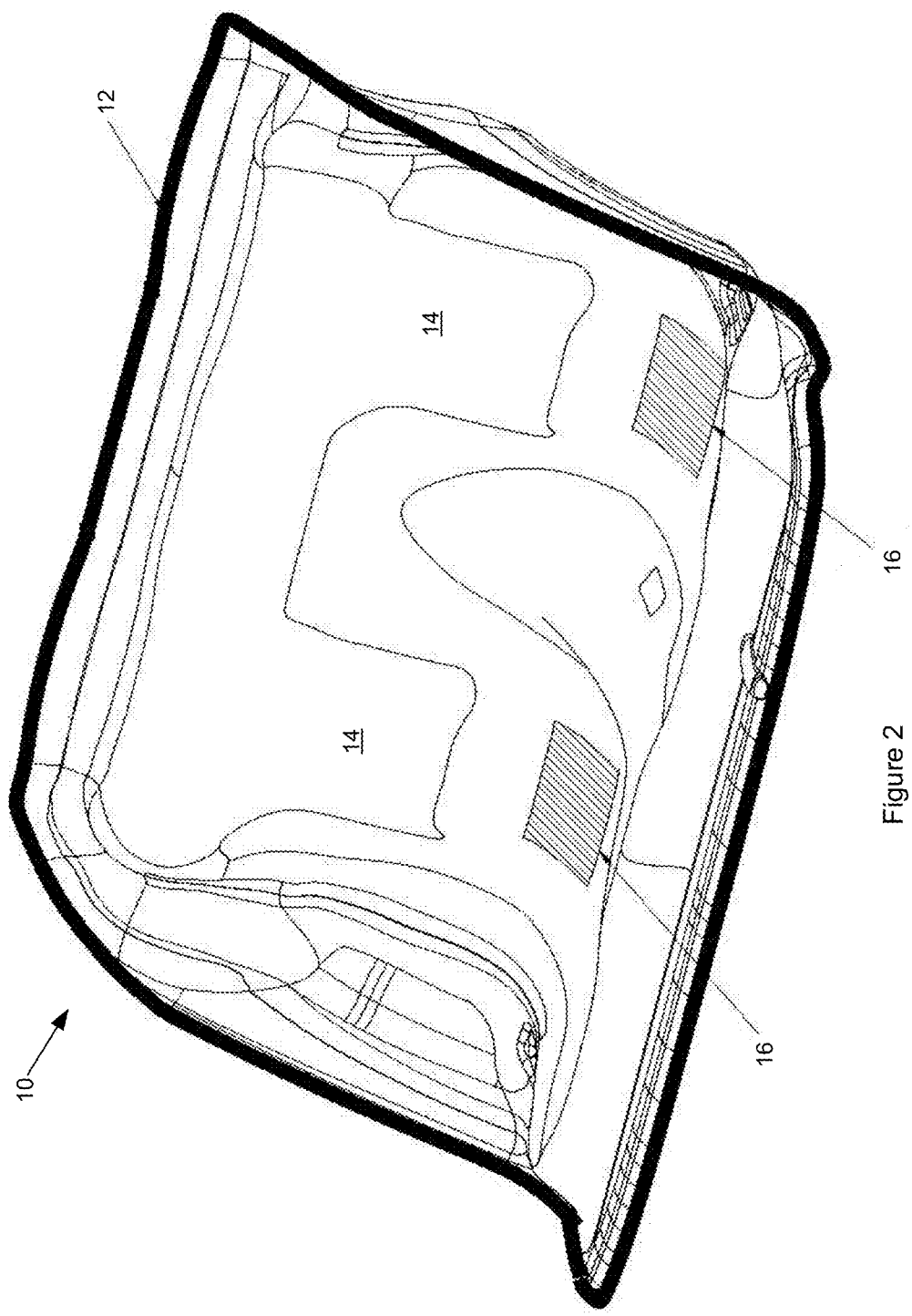
FIG. 2 is substantially a perspective view of the seat of FIG. 1.

In FIGS. 1 and 2, there is shown respective plan and perspective views of a seat 10. The seat 10 in the embodiments of FIGS. 1 and 2 is vacuum formed to be a single piece molding that can be inserted in the rear passenger area of a vehicle, in particular, though not exclusively, a police patrol car. Alternative methods for forming the seat may be apparent to the person skilled in the art and all such methods are intended to be encompassed herein. The seat molding 10 has a first contact zone 12 that extends substantially around the periphery of the seat and contacts the body of the vehicle. The first contact zone 12 may be continuous around the periphery of the seat or may have a plurality of discrete contact points around the periphery.

The seat 10 is molded to provide one or more recesses 14 that accommodate the body profiles of one or more passengers. In the embodiment shown, two recesses 14 are provided for accommodating two passengers, though a different number of body profile recesses may be provided. It is a desirable characteristic when used as a prisoner transport seat for the profile of the recess to be able to accommodate a passenger that has their hands cuffed behind their back.

In addition to the first contact zone 12 around the periphery of the seat, one or more second contact zones 16 may be provided in the inner area of the seat away from the periphery. The second contact zone 16 contacts the body of the vehicle and provides additional support in the area of the body recesses 14. In one embodiment, the one or more second contact zones 16 are located in the area of the body recess 14 that receives the buttocks of the passenger. This prevents sagging and flexing of the seat in this area. As shown in FIGS. 1 and 2, the second contact zones 16 provide a substantial contact area between the seat and the vehicle.

Figure 3:
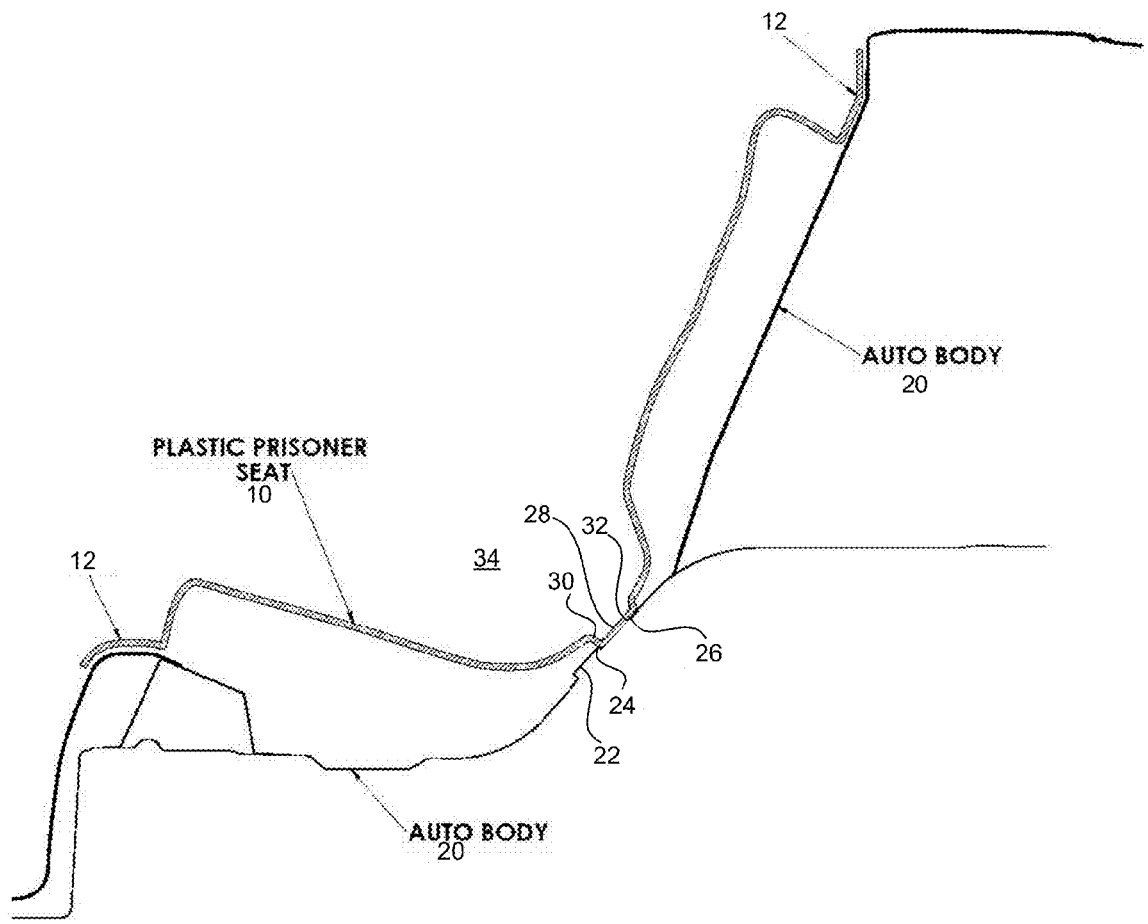
FIG. 3 is substantially a side view of one embodiment of a seat shown disposed in a vehicle.

An embodiment of the seat is shown in side view in FIG. 3. FIG. 3 shows the seat 10 in place in the back seat area of a passenger vehicle. The seat 10 rests on the vehicle body 20 in the first contact zone and the second contact zone. The seat may be affixed to the vehicle body 20 in one or more places around the first contact zone, i.e. around the periphery of the seat 10. The seat 10 may be affixed by any suitable means including, without limitations, mechanical fasteners such as screws, rivets, bolts, clamps, etc. as well as chemical fasteners such as adhesives.

The second contact zone(s) 16 may be designed to engage with one or more structural components or formations of the vehicle body 20. In the embodiment of FIG. 3, the vehicle body 20 is shown to have a projection 22. The projection 22 provides a multi-surface structure having at least one projecting surface 24 that projects from the surface 26 of the vehicle body panel 20. The seat 10 can be designed to have a complementary multi-surface structure in the second contact zone 16 that engages, rests on, nestles with or otherwise interlocks with the multi-surface formation of the vehicle body. The second contact zone may comprise a first surface of the seat molding and a second surface of the seat molding that joins with the first surface at an angle, such as 90 degrees, to form an edge. The edge provides a multi-surface formation that can engage or nestle with a complementary multi-surface formation of the vehicle body.

In the embodiment depicted, the second contact zone includes a projection 28 that projects to underneath the seat. The projection 28 includes a side surface 30 that engages the projecting surface 24 of the vehicle body and an outer surface 32 that engages the vehicle body surface 26. The nesting or interlocking nature of the second contact zone and the vehicle body through the use of complementary multi-surface formations ensures that the seat remains engaged with the vehicle body in the second contact zone. The second contact zone is thus supported by the vehicle body in this zone and the seat will not flex substantially when a passenger is placed in the seat. The seat 10 may be secured to the vehicle body 20 at the second contact zone, e.g. between the surface 32 and the surface 26, by suitable mechanical or chemical fasteners such as those described above. Shock absorbing or cushioning structure or material may be placed in between the seat 10 and the vehicle body 20, e.g. at the second contact zone 16 or elsewhere, to reduce vibration, shock and discomfort.

As depicted in FIG. 3, the second contact zone is disposed in the recess 34 of the seat that accommodates the buttocks of the passenger, though it will be appreciated that the second contact zone may be located in any position necessary to engage a structural component of the vehicle body.

Figure 4:
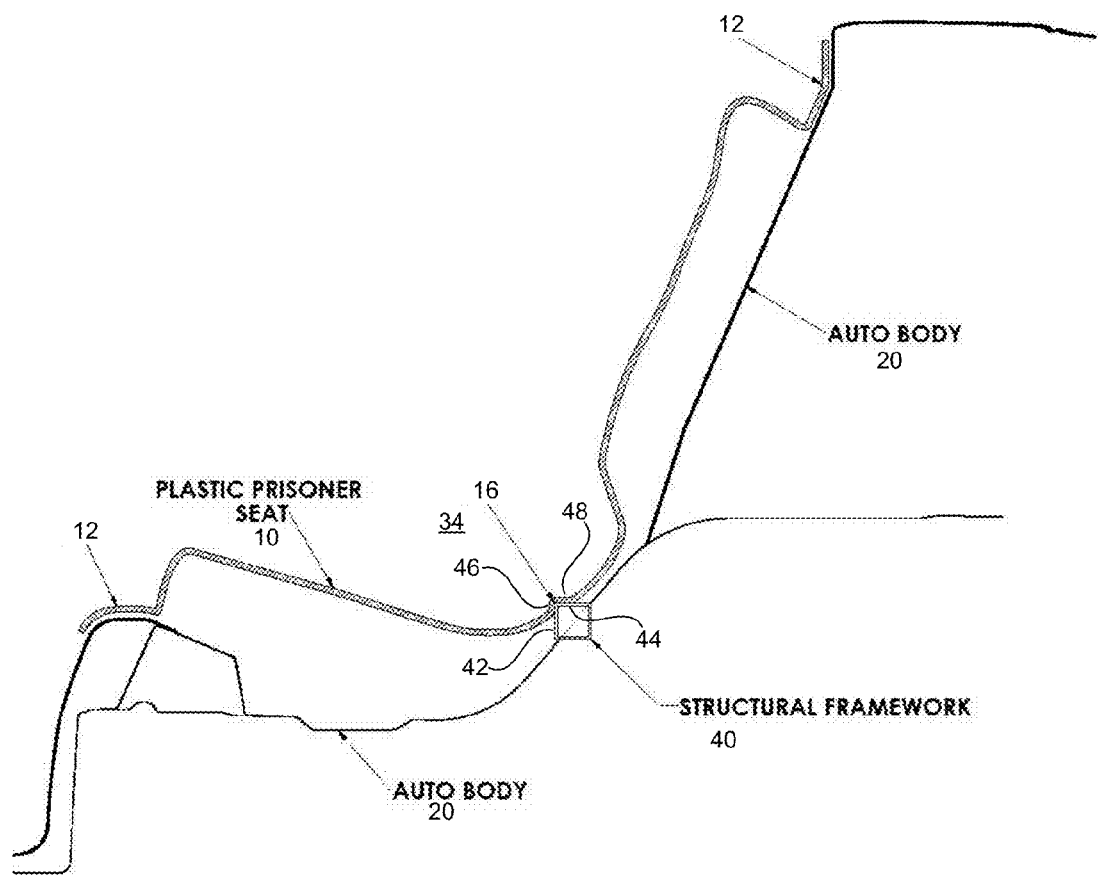
FIG. 4 is substantially a side view of an alternative embodiment of a seat shown disposed in a vehicle.

An alternative embodiment is depicted in FIG. 4. In this embodiment, the vehicle body includes structural framework 40 that projects from the panels 20 of the vehicle body. The framework 40 is shown with a first vertical surface 42 and a second horizontal surface 44 though the angles of these multiple surfaces is not pertinent. The seat 10 is formed with a second contact zone 16 that includes multiple surfaces 46, 48 that engage the vertical and horizontal surfaces of the framework 40. The multiple surfaces 46, 48 form a projection that projects above the seat surface, into the body recess.

The seat 10 is installed in place of any conventional pre-existing rear passenger seat. That is, if a rear passenger seat is in place, the rear passenger seat is removed prior to installing the seat 10. The seat 10 is intended to be used directly onto the vehicle framework rather than over an existing rear passenger seat.

The design of the seat can be made in conjunction with the vehicle manufacture's CAD geometry of the vehicle. This can ensure that the area of the seat under the passenger's buttocks comes in direct contact with the vehicle body or structural framework. Accordingly, the seat 10 may be different for different types of vehicle.

The central support improves the safety of the seat in the event of an accident, helps the seat last longer due to less stress and fatigue and reduces the cost of the seat as thinner material may be used.

First Alternative Embodiment

Figure 5:
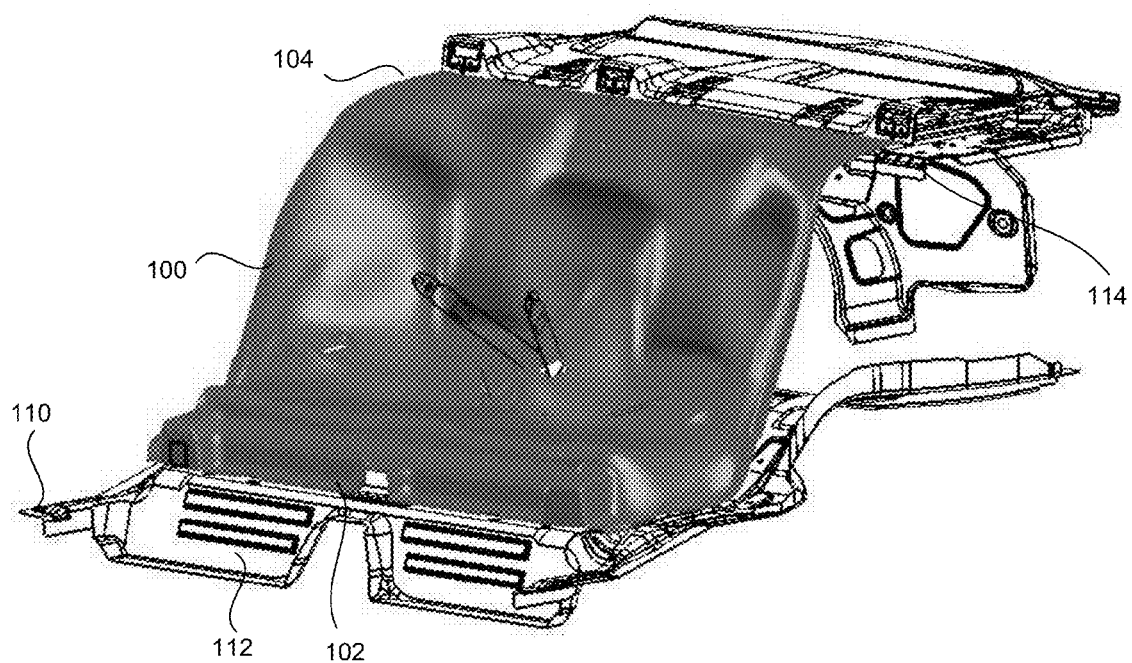
FIG. 5 is substantially a front perspective view of a molded seat installed in a vehicle.

An embodiment of a molded seat is shown in FIG. 5. The seat 100 is depicted in situ in the rear passenger bay of a vehicle 110. This embodiment is particularly suited for use in sedans, though not exclusively. The lower periphery of the seat 102 is molded to correspond to the shape of the floor 112 of the vehicle. An upper periphery 104 of the seat engages with an upper body component 114 of the vehicle. Though not shown in FIG. 5, the vehicle would ordinarily include trim elements that would engage with the side peripheries of the seat to prevent gaps that, in addition to being unsightly, could allow persons to hide items, such as contraband, etc.

Figure 6:
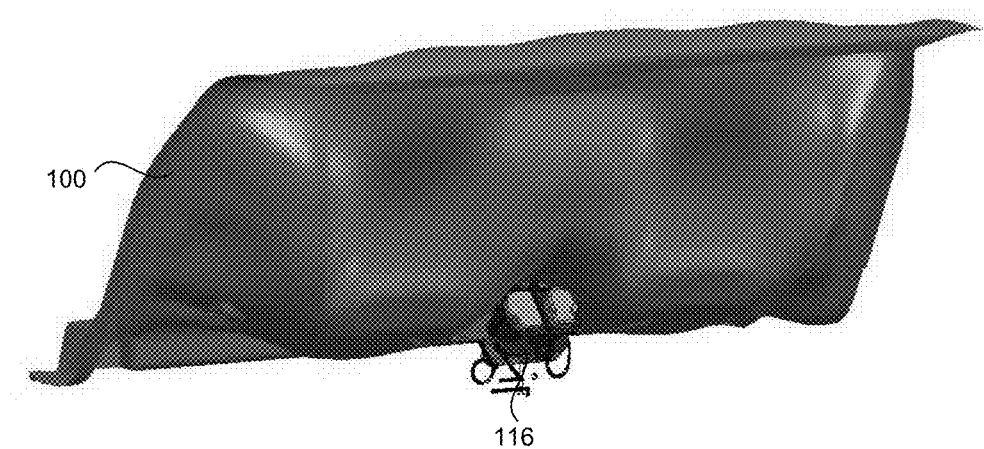
FIG. 6 is substantially a rear perspective of the seat of FIG. 5 showing a seat belt retractor.

FIG. 6 shows the seat from a rear perspective. The seat has the advantage of allowing a seat belt retractor 116 to be located in the centre, underneath the seat 100, in a cavity of the seat as viewed from beneath the seat. Prior art retractors are mounted on the top of the seat, which blocks some of the driver's rear view. Retractors that are center mounted beneath the seat can also be safer because the locking mechanism activates sooner than other configurations. Mounting the retractor under the seat also allows more freedom for positioning and can make more effective use of the available space.

A centrally mounted retractor can further assist in securing a prisoner in the prisoner transport seat because it does not require police officer to reach across the prisoner to the same degree.

Second Alternative Embodiment

In one embodiment, there is provided a vehicle seat support arrangement which will be described herein with reference to FIGS. 7 to 14. The support assembly is particularly suitable for use in Sport Utility Vehicles (SUVs) and the like, though it is not exclusively for this purpose.

Figure 7:
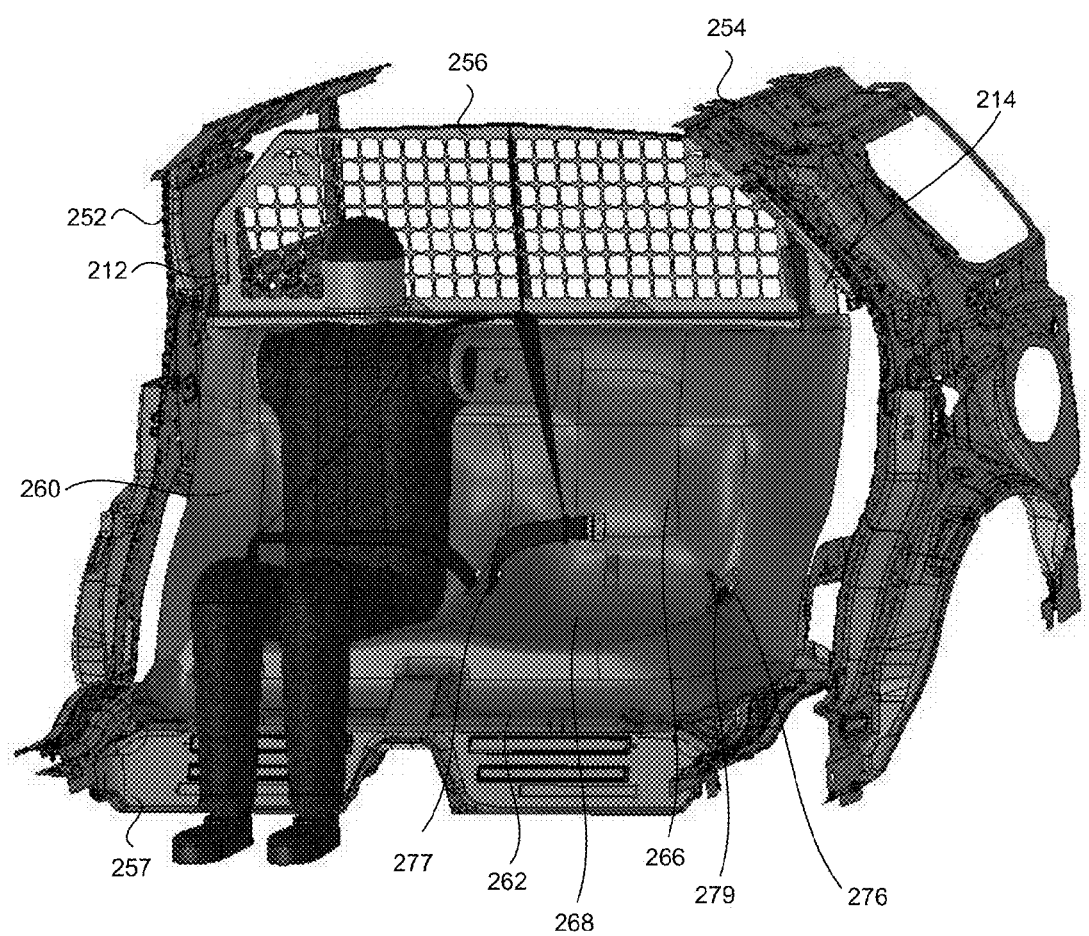
FIG. 7 is substantially a front perspective of a molded seat installed in a vehicle on a seat support framework.
Figure 8:
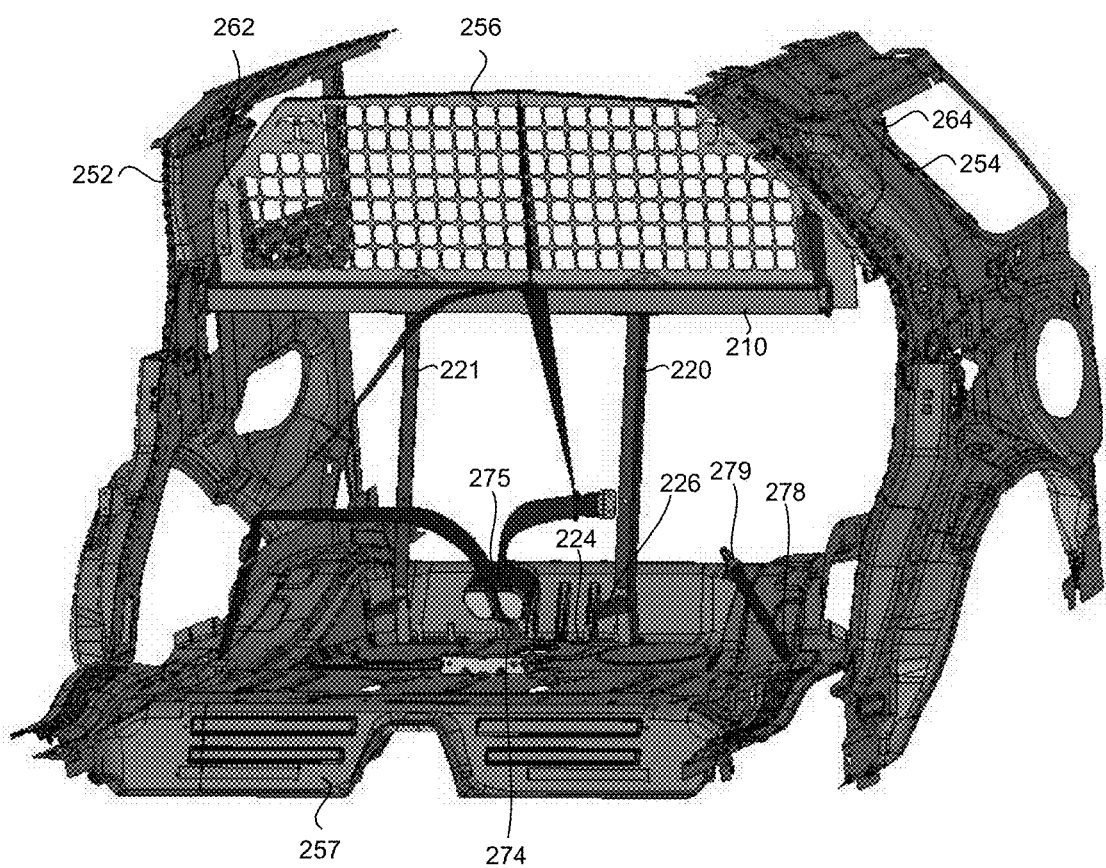
FIG. 8 is substantially the view of FIG. 7 with the passenger and seat removed.
Figure 9:
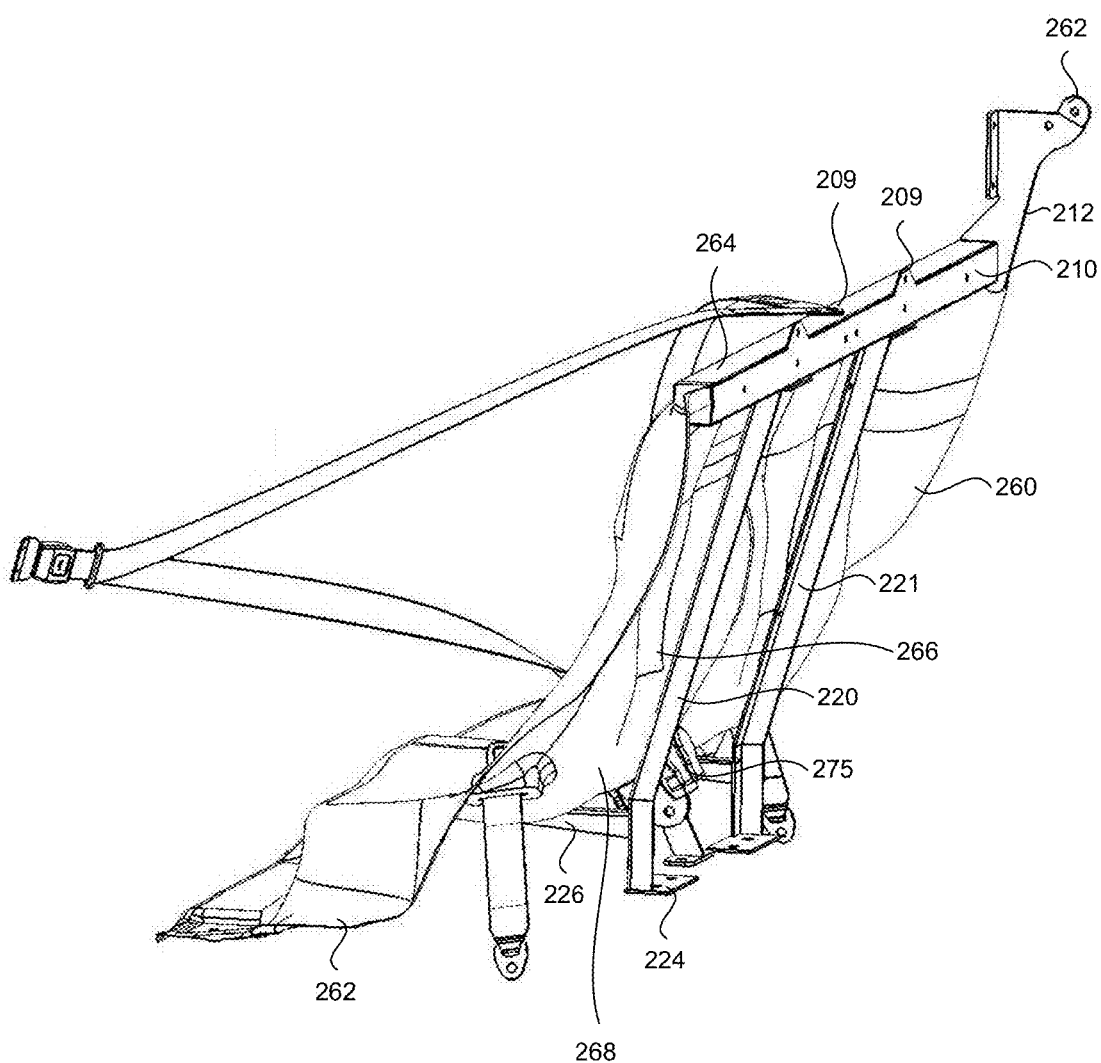
FIG. 9 is substantially a rear perspective showing the seat support framework.

FIG. 7 is a front perspective view of a prisoner transport seat and support framework in situ in a vehicle. FIG. 8 is the same view as FIG. but with the seat and prisoner removed. The support arrangement or framework is shown in a rear perspective view in FIG. 9 with a seat and seat belt retractor system in place but with the left side mounting bracket (right side as shown in FIG. 9) removed for clarity.

Figure 10:
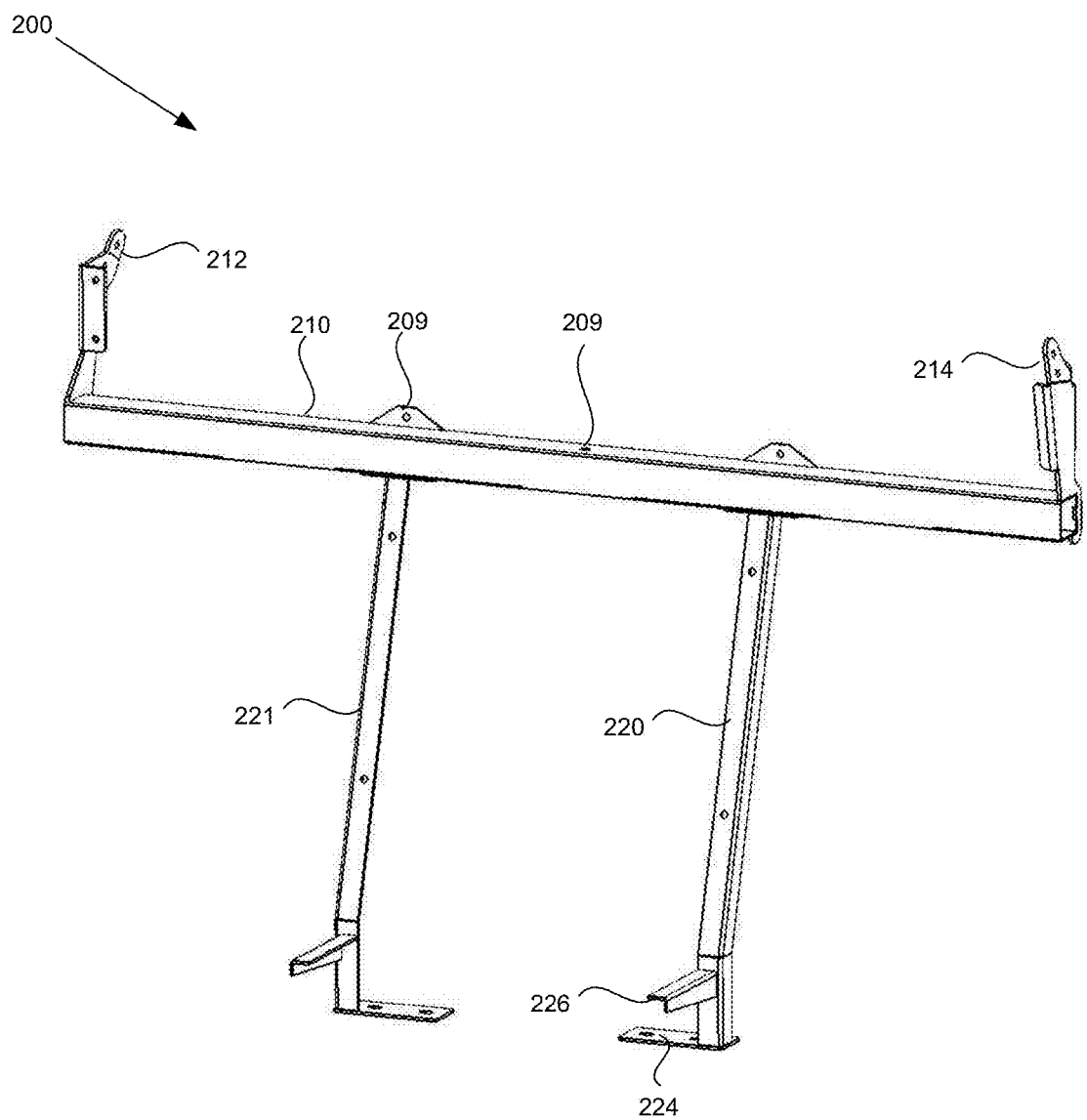
FIG. 10 substantially shows the seat support framework in isolation.

The support arrangement 200, shown as an isolated framework in FIG. 10 includes a cross frame member 210 that extends horizontally between a first side 252 of the vehicle and a second side 254 of the vehicle. The cross bar 210 is attached at the first and second sides by respective first and second brackets 212, 214 at first and second attachment points 262, 264. In one embodiment, the first and second attachment points 262, 264 are the seat belt anchor points that are provided as standard features in a vehicle, prior to the vehicle being modified for prisoner transport capabilities. The seat belt anchor points thus provide strong and secure attachment for the cross frame member.

Extending downward of the cross frame member 210 are vertical supports 220, 221. While two vertical supports 220, 221 are shown, one or more vertical supports may be provided. The vertical supports 220, 221 extend downward of the cross frame member 210 toward the floor 257 of the vehicle and are secured to the floor 257 of the vehicle by a bolt plate 224. Each vertical support 220, 221 includes an outwardly extending seat support member 226.

The support arrangement 200 provides support to the seat 260. The seat 260 is molded in a lower portion 262 to contour to the floor 257 of the vehicle. The upper portion 264 of the seat is molded to provide a surface that engages an upper surface 216 of the cross frame. The seat support members 226 provide support underneath a bucket section 268 of the seat that receives the buttocks of the passenger, i.e. in a weight bearing area of the seat. A back rest portion 266 of the seat rests against the vertical supports 220, 221.

A seat belt retractor 275 is anchored at a central contact portion 274 between the floor mounting brackets 224 of the vertical supports and passes through a slot 277 in the middle portion of the seat between the two body profile recesses. A connector portion 279 of the seat belt is anchored at a side anchor 278 and is fed through a slot 276 in the side of the seat.

Figure 11:
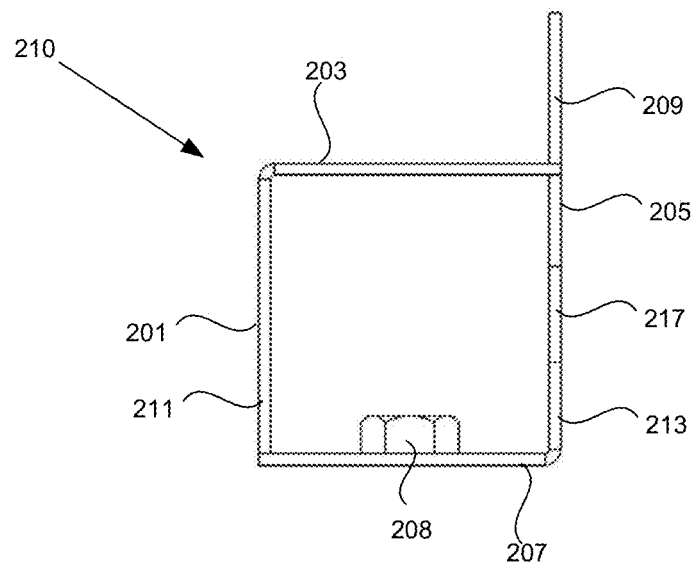
FIG. 11 is substantially a side view of a cross frame member.

The seat support arrangement 200 is shown in isolation in FIG. 10. In one embodiment, the cross frame member is sheet steel that is folded into a tube. A side view of the cross frame member 210 is shown in FIG. 11. The tube may be formed from two separate stamped pieces 211, 213. A first piece 211 may be bent at 90 degrees to form the front 201 and upper 203 surfaces of the cross frame member. A second piece 213 may be bent at 90 degrees to form the back 205 and lower 207 surfaces of the cross frame member. The two pieces 211, 213 may be welded to form a square tube. The back surface 205 may include one or more extensions or projections that extend upward and facilitate connection of a security grill 256 as shown in FIG. 7.

The second piece 213 may include one or more apertures in the lower surface 207 for receiving bolts to connect the vertical supports 220, 221. Nuts 208 may be welded to the interior surfaces of the second piece 213, in alignment with the apertures, prior to welding with the first piece 211. Alternatively, the apertures may be threaded in place of the nut 208.

The first piece 211 may also include one or more apertures 209 in a section of the sheet that will form the upper surface 203 of the cross frame member for receiving bolts to secure the seat to the cross frame member. Nuts (not shown) may be welded inside the cross frame member in alignment with the aperture 209. The bolt and bolt holes may serve the dual purpose of providing an upper anchor point for the sash of the seat belt. While a single upper aperture is shown, multiple apertures may be provided. Alternative attachments for securing the seat to the cross frame member will be apparent to the person skilled in the art.

Additional holes 217 and nuts may be provided on the rear surface 213 of the cross frame member for securing the security grill 256.

Figure 12:
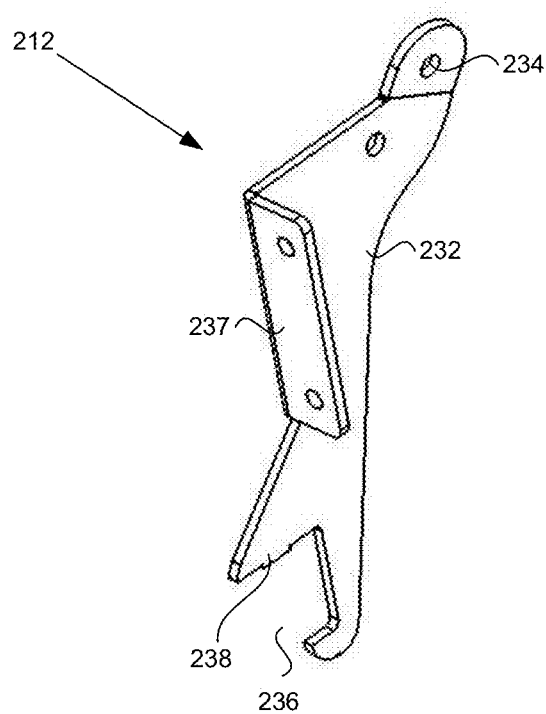
FIG. 12 is substantially a perspective of a mounting bracket.

A right side mounting bracket 212 for mounting the cross frame member to the right side of the vehicle (left side as shown) is depicted in FIG. 12. The bracket 212 is substantially a plate 232 with one or more apertures 234 for securing at the seat belt attachment points provided in the side body framework of the vehicle using bolts or other suitable fasteners. Other mounting points may be apparent to the person skilled in the art. The plate 232 may include one or more folds or bends to shape the plate for appropriate attachment. A cutout 236 in the plate is shaped to correspond to the cross frame member 210. For example, the cutout 236 depicted has a square configuration to accommodate the square profile of the cross frame member 210. The cutout 236 may include a projection 238 that is located into a notch of the cross frame member to facilitate the attachment of the bracket to the cross frame member, e.g. in a welding process. The bracket 212 may include a fold that produces a second mounting face 237 that can be used for additional securing of the security grill 256.

The bracket 212 may be stamped and folded from steel sheet, though other materials and manufacturing processes will be apparent to the skilled addressee.

Figure 13:
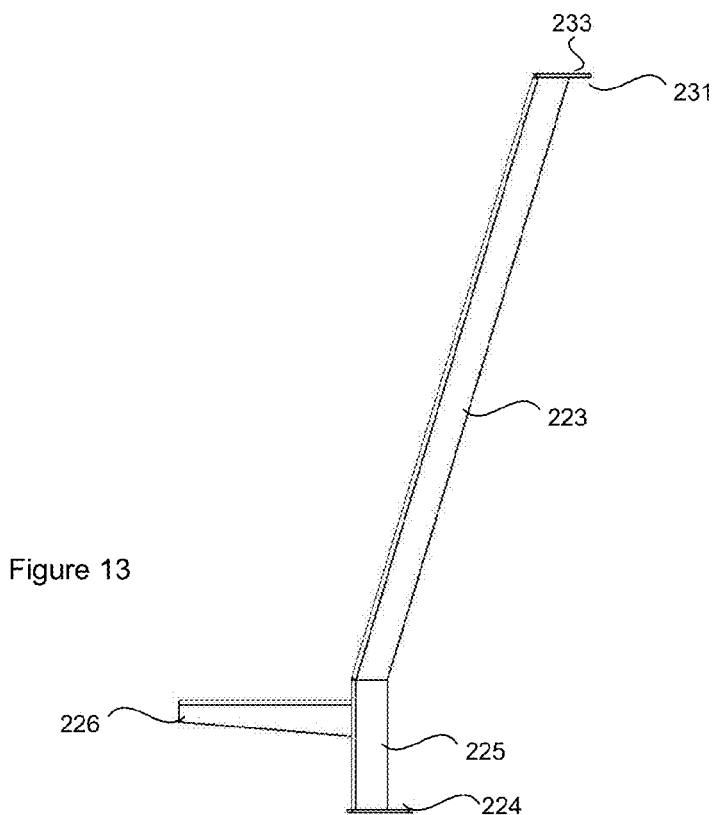
FIG. 13 is substantially a side view of a vertical support.
Figure 14:
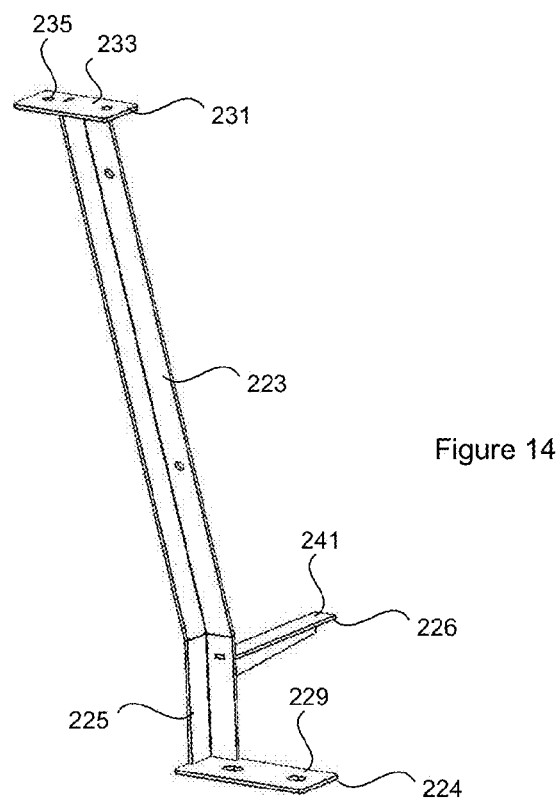
FIG. 14 is substantially a perspective view of the vertical support.

The vertical members 220, 221 are shown in detail in FIGS. 13 and 14. The term vertical is used herein to describe that the vertical members extend in a generally vertical direction between the floor and the cross frame member. The vertical members do not need to be strictly vertical and their particular orientation will depend on the aspects of the vehicle, such as the required location of the seat, the seat belt anchor points, suitable locations on the floor for the floor mounting brackets, etc.

The vertical members may have an upper section 223 which may be a piece of angle steel, tubing, or the like. The upper section 223 may be continuous with a lower section 225 through a bend or fold to form an angle. Alternatively, the lower section 225 may be a discrete piece that is connected at an angle to the upper section through a weld, bolts, or other suitable attachment.

The seat support member 226 may be welded or otherwise attached at one end to the lower section. The seat support member 226 is cantilevered to extend outwards from the lower section 225 to a distal end and projects toward the front of the vehicle when the seat support arrangement is mounted. That is, the seat support member 226 projects into the rear passenger bay. The seat support member may be a piece of angle steel that has a substantially flat upper surface 241 that is used to support the seat. The seat support member may include a projection at the end that attaches to the lower section. The projection may be received in a slot or notch in the lower section to facilitate a welding process. The seat support member 226 is shown as being substantially horizontal but may be provided at any appropriate orientation sufficient to support the seat.

A lower mounting plate 224 may be welded or otherwise attached at the foot or base of the lower section 225. The lower mounting plate 225 has one or more apertures 229 and is used to secure the vertical support to the floor of the vehicle using bolts or other suitable fasteners. The lower mounting plate 224 is shown as substantially flat but may be contoured or shaped if required to match the shape of the vehicle floor.

An upper mounting plate 231 is attached, e.g. welded, to the top of the upper section 223. The upper plate 231 has an upper flat surface 233 that sits against the lower surface of the cross frame member. The upper plate 231 may include one or more apertures 235 that allow bolts to secure the mounting plate to nuts welded into the cross frame member as described previously.

The seat support arrangement 200 of the presently described embodiment is relatively easy to install because it utilizes the pre-existing seat belt pivot points. Additional advantages include that it can strengthen the vehicle while provided support to the molded seat. Space underneath the seat can be utilized when compared to convention rear passenger seats.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A seat for use in a passenger vehicle, the vehicle having an interior passenger compartment defined in part by a first side and a second side, a first seat belt shoulder anchor point on the first side and a second seat belt shoulder anchor point on the second side, the seat comprising:
    (A) at least one cross frame member, the cross frame member being attached to the first and second anchor points and extending between the first and second sides; and (B) a molding, the molding comprising a first and second contact zone and a periphery, the first contact zone being adjacent to the periphery, wherein the first contact zone comprises a first surface that engages at least one surface of the cross frame member, wherein the cross frame member at least partially supports the molding; and
    the second contact zone located inward of the periphery, the second contact zone comprising a formation that is configured to engage a formation of a vehicle body.

2. The seat of claim 1 wherein the molding comprises at least one body recess configured to receive the body of a passenger of the vehicle.

3. The seat of claim 2 wherein the at least one body recess is configured to accommodate hands of the passenger behind a back of the passenger when the passenger is seated in the at least one body recess.

4. The seat of claim 2 wherein the at least one second contact zone is located underneath the at least one body recess.

5. The seat of claim 2 wherein the at least one second contact zone is located in a region of the at least one body recess that is configured to receive the buttocks of the passenger when the passenger is seated in the respective body recess.

6. The seat of claim 2 comprising at least two body recesses.

7. The seat of claim 1 wherein the at least one second contact zone comprises a first surface of the seat molding and a second surface of the seat molding that joins with the first surface at an angle to form an edge, wherein the edge is configured to engage the multi-surface formation of the vehicle body.

8. The seat of claim 1 wherein the multi-surface formation of the vehicle body comprises a projection, and wherein the at least one second contact zone comprises a first surface and a second surface that are complementary to respective first and second surfaces of the projection.

9. The seat of claim 1 wherein the at least one second contact zone comprises a projection above the seat.

10. The seat of claim 1 wherein the at least one second contact zone comprises a projection below the seat.

11. The seat of claim 1 comprising a cavity in an underside surface of the seat that is configured to accommodate a seat belt retractor.

12. A seat comprising:
    (A) molded means for providing a seat for one or more passengers in a vehicle, the molded means comprising:
        (a) peripheral means for contacting a vehicle body about the periphery of the molded means, wherein the peripheral means comprises means for engaging at least one surface of a cross frame member means for supporting the seat, the means for supporting the seat comprising means for anchoring the means for supporting the seat at seat belt anchor points on first and second sides of the passenger vehicle.

13. The seat of claim 12 comprising body recess means for receiving the body of a passenger.

14. The seat of claim 12 wherein the inward contact means projects upward of the molded means.

15. The seat of claim 12 wherein the inward contact means projects downward of the molded means.

16. The seat of claim 12 comprising means for accommodating a seat belt retractor beneath the molded means.

\* \* \* \* \*